(12) United States Patent
Connor et al.

(10) Patent No.: US 8,180,597 B2
(45) Date of Patent: May 15, 2012

(54) UTILITY NETWORK ENGINEERING AND DESIGN RULES IN THREE-DIMENSIONAL MODELS OF UTILITY NETWORKS

(75) Inventors: Edward James Connor, Manchester, NH (US); Craig Storms, Concord, NH (US); Michael A. Appolo, III, Derry, NH (US); Tim Burnham, New Boston, NH (US); Steve Milligan, Merrimack, NH (US); Michael C. Rogerson, Manchester, NH (US); Kenneth W. Spalding, III, Mont Vernon, NH (US)

(73) Assignee: Autodesk, Inc., San Rafael, CA (US)

( * ) Notice: Subject to any disclaimer, the term of this patent is extended or adjusted under 35 U.S.C. 154(b) by 644 days.

(21) Appl. No.: 11/272,317

(22) Filed: Nov. 10, 2005

(65) Prior Publication Data

US 2007/0168923 A1  Jul. 19, 2007

(51) Int. Cl.
*G06F 17/50* (2006.01)

(52) U.S. Cl. .......................................................... 703/1

(58) Field of Classification Search ....................... 703/1
See application file for complete search history.

(56) References Cited

U.S. PATENT DOCUMENTS

| | | | | |
|---|---|---|---|---|
| 5,255,207 A | * | 10/1993 | Cornwell | 703/1 |
| 2005/0251494 A1 | * | 11/2005 | Maria Jansen | 707/1 |

* cited by examiner

*Primary Examiner* — Paul Rodriguez
*Assistant Examiner* — Luke Osborne
(74) *Attorney, Agent, or Firm* — Patterson & Sheridan, LLP

(57) ABSTRACT

One embodiment of the invention provides a method for modeling a variety of three-dimensional (3D) utility networks constructed from individual parts. In one embodiment, users may construct a utility network by selecting and assembling a network of inter-connected parts, where each part may be associated one or more design rules. When a part is placed within the model, the rules corresponding to the part may be applied. The network part rules may be configured to adjust the position, properties or attributes associated with a network part to comply with a rule. Alternatively, a user interface display may provide an indication of any network parts of a 3D model that violate a particular network part rule.

17 Claims, 9 Drawing Sheets

800

CIVIL 3D - RULES DIALOG

FILE  OPEN  EDIT  TOOLS

| Information | Rules | Summary |

805

| Rule | Value |
|---|---|
| ☐ Rim - Elevation | |
|     Rim Elevation Adjustment | 0.05" — 825 |
|     Adjust Rim Elevation on Resize or Placement | True — 830 |
| ☐ Pipe - Slope | |
|     Minimum Slope | 3% — 835 |
|     Modify Slope on Resize or Placement | True — 840 |
| ☐ Pipe - Cover Minimum Cover | 4" — 845 |
|     Adjust Depth on Resize or Placement | False — 850 |

810
815
820

[ OK ]  [ CANCEL ]  [ APPLY ]

FIG. 8

UTILITY NETWORK ENGINEERING AND DESIGN RULES IN THREE-DIMENSIONAL MODELS OF UTILITY NETWORKS

CROSS REFERENCE TO RELATED APPLICATIONS

This application is related to commonly assigned, co-pending U.S. patent application Ser. No. 11/250,239, titled "Method for Dynamically Generating Multiple Views of Three-Dimensional Models for Utility Networks," filed on Oct. 13, 2005, incorporated fully herein by reference.

BACKGROUND OF THE INVENTION

1. Field of the Invention

The present invention generally relates to computer software. More specifically, the present invention relates to computer software applications configured to facilitate the interactive design of three-dimensional (3D) models of utility networks using a collection of customizable, dynamically applied design rules.

2. Description of the Related Art

Currently, computer aided design (CAD) applications are available that allow a designer or engineer to compose a graphical representation of real-world three-dimensional (3D) structures. For example, computer aided design (CAD) applications are available that allow a designer or engineer to construct graphical representations of utility networks such as gas, electricity, or surface water utility networks. For example, a user may generate a representation of a surface water utility network using drawing elements to represent elements as pipes, conduits, manhole covers, catch basins, along with other pipes and structures.

Related application "Method for Dynamically Generating Multiple Views of Three-Dimensional Models for Utility Networks" describes a CAD application used to construct 3D models of utility networks by selecting and placing a network of inter-connected network parts. For example, to construct a model of a surface water utility network, a user may select the appropriate part objects from a pipe and structure list. Connectivity among parts is established through part placement. Internally, the pipe and structure parts may be represented by model data that defines a set of common behavior and properties for a part, as well as data regarding each instance of a network part in the 3D model. Thus, an instance of a network part included in a 3D model may specify a location within a 3D terrain model (both above and below ground) as well as attributes such as size, type, material, manufacturer etc. If a user modifies position or data for a given network part, the CAD application resizes and updates any associated two-dimensional and three-dimensional views of the utility network. Typically, many different views may be created to represent the same utility network from different perspectives. For example, a plan view may provide a "top-down" perspective and a profile view may provide a cross-sectional perspective of the utility network.

Often, the real-world structure corresponding to the 3D model is subject to many design considerations. For example, the requirements for a planned surface water utility network may specify that all pipes should have a certain minimum amount of ground cover, or that certain pipes should have a maximum length, slope, or other characteristics. Engineering structures, such as catch basins or drainage tanks, may also have requirements specifying size, minimum cover, or proximity to other existing structures, etc. For a 3D model to be useful, it should conform to these restrictions.

However, ensuring that a given 3D model conforms to real-world design requirements has proven to be difficult. CAD applications are typically configured to provide a great deal of flexibility and do not constrain how parts are placed within a model, because of the level of variation that may occur in real-world utility networks. Consequently, the user must ensure that parts and structures included in a model conform to any design constraints for the real-work structure manually. Since the user does this for each component or part placed in the model, the process can quickly become a time consuming and tedious.

Furthermore, even when the user goes to ensure that the network parts included in a 3D model conform to a set of design requirements, subsequently changing or validating the requirements is also difficult. For example, a user may wish to change one of the requirements and ascertain which parts of the 3D model are affected. Doing so requires the user to walk through elements of the model and manually review each component that may be affected by such a change to determine whether these components are, in fact, affected. Again, this process is both time consuming and tedious.

Accordingly, there remains a need for a CAD application that allows a user to construct a model of a real-work 3D structure, such as utility network, that provides a user with sufficient flexibility to model a large variety of real-world scenarios, and that simultaneously allows a user to efficiently compose a model subject to various design constraints, as well as permutations of these constraints.

SUMMARY OF THE INVENTION

Embodiments of the invention provide a method, apparatus, and article of manufacture that allows for the efficient construction of three-dimensional models (3D models) of utility networks, consistent with a collection of design requirements or rules. In one embodiment, a 3D model may be composed from many virtual network part objects (or more simply, just "parts"). This allows a utility network to be modeled as a set of inter-connected network parts representing, for example, pipes, wires, conduit, manholes, catch basins, pumps, valves, transformers, etc. Network parts may be associated with a set of properties related to both an individual part and to other parts connected together throughout the topology of the utility network. Part objects in the 3D model may be aggregated to include surrounding part objects, allowing the aggregation to be managed as an interconnected group.

In addition to this intuitive, flexible approach to constructing a 3D model of a utility network, embodiments of the invention provide a collection of part rules that may be associated with different utility networks or to individual parts. Collectively, the part rules provide intelligent layout and editing behavior to a designer constructing a 3D model. For example, a part rule may specify that the pipes of a storm water utility network must be placed a minimum of four feet below ground. When a user adds a pipe to the utility network, the CAD application may be configured to adjust the position of the pipe to account for changes in ground elevation, maintaining the depth of the pipe at greater then four feet. Other examples of rules that may be specified for a surface water utility network include minimum pipe slope, maximum pipe slope, minimum pipe cover (depth), maximum length between structures, pipe-drop within structures, surface placement offset, automated part sizing, etc.

Part rules are managed independently from one another, may be applied in any order, and may be individually enabled or disabled. During the course of constructing a 3D model, a wide variety of scenarios may be contemplated, and part rules may be applied in a flexible manner according to rule priorities. Higher priority rules are applied first, and if a rule is violated by the placement of a particular part, other rules may still be applied. Typically, network parts are placed in the 3D model according to the associated rules for a given network part.

When a part violates a rule specified for the part, a user may be provided feedback through a graphical user interface. This allows a semi-automated means to adjust and correct errors. For example, in one embodiment, a dialog box may display a tabular view of parts indicating one or more rule has been violated. The graphical user interface may allow a user to zoom to the display of any particular part for which a rule violation has been detected.

Further, a constructed 3D model may be validated against a set of rules. That is, a user may chose to re-apply rules after editing the position of a part within a 3D model or by modifying the properties of a given part. By doing this multiple times for rule collections, a broad variety of scenarios for the 3D model may be evaluated. Users may also make adjustments for varied design scenarios by adjusting the rules. Rules may be toggled on or off, priority of rules may be changed, and input values for rules may be modified, providing a rich engineering toolkit. In addition to providing a set of rules with customizable parameters, embodiments of the invention may provide users with access to elements of the part rules logic through a user-accessible API. Thus, users may compose custom rules that may be implemented for a particular part, providing an additional layer of customization and rule flexibility.

BRIEF DESCRIPTION OF THE DRAWINGS

FIG. 8 illustrates a graphical user interface display showing network part rules, according to one embodiment of the invention.

DETAILED DESCRIPTION OF THE PREFERRED EMBODIMENTS

Embodiments of the invention provide a method, apparatus, and article of manufacture for creating a computer-generated three-dimensional model (3D model) of a utility network that is composed from many network part objects (or more simply, just "parts"). Each part inserted into a 3D model may correspond to a real-world component of a utility network. Similarly, the 3D model may include terrain features modeling a real world location. As parts are selected and placed within the 3D model, the CAD application may be configured to process a collection of rules associated with each individual part. The rules may be used to manage a custom set of criteria for a given design project. For example, the network part rules may be configured to modify the data or attributes associated with a part when it is placed in the 3D model. Alternatively, the rules may be applied to an existing 3D model to identify any network parts that fail to comply with a given rule. This allows a user to identify segments of the 3D model that require additional analysis or scrutiny.

The following discussion describes an embodiment of a CAD application that may be used to model a surface water utility network using network parts such as pipes, manholes, catch basins and storm sewers. However, embodiments of the invention are not limited to modeling utility networks of any single type and may be extended to other utility networks. For example, embodiments of the invention may be adapted to model utility networks such as telecommunications networks, pipeline networks, and power grid networks, etc.

In one embodiment, users of a CAD application may be provided with a catalog of network parts or part families that may be used to compose the 3D model. The CAD application may be configured to allow a user to dynamically size and resize the network parts within the 3D model. Typically, the network parts themselves, represent real-world constructs (e.g., pipes, catch basins, manholes, etc.). Further, many 2D graphical views may be generated using a 3D model, such as various, plan, profile, and section views. When the properties for one part are modified, other parts in the 3D model may be automatically updated. Any part visible from a given view may be selected and modified. When a user modifies a part within one view, other views are also dynamically updated to reflect these modifications. Similarly, the attributes and annotations regarding a given part may be modified from a single view, and every view of the model that includes the part may also be updated without requiring any further actions by the user.

Figure 1:
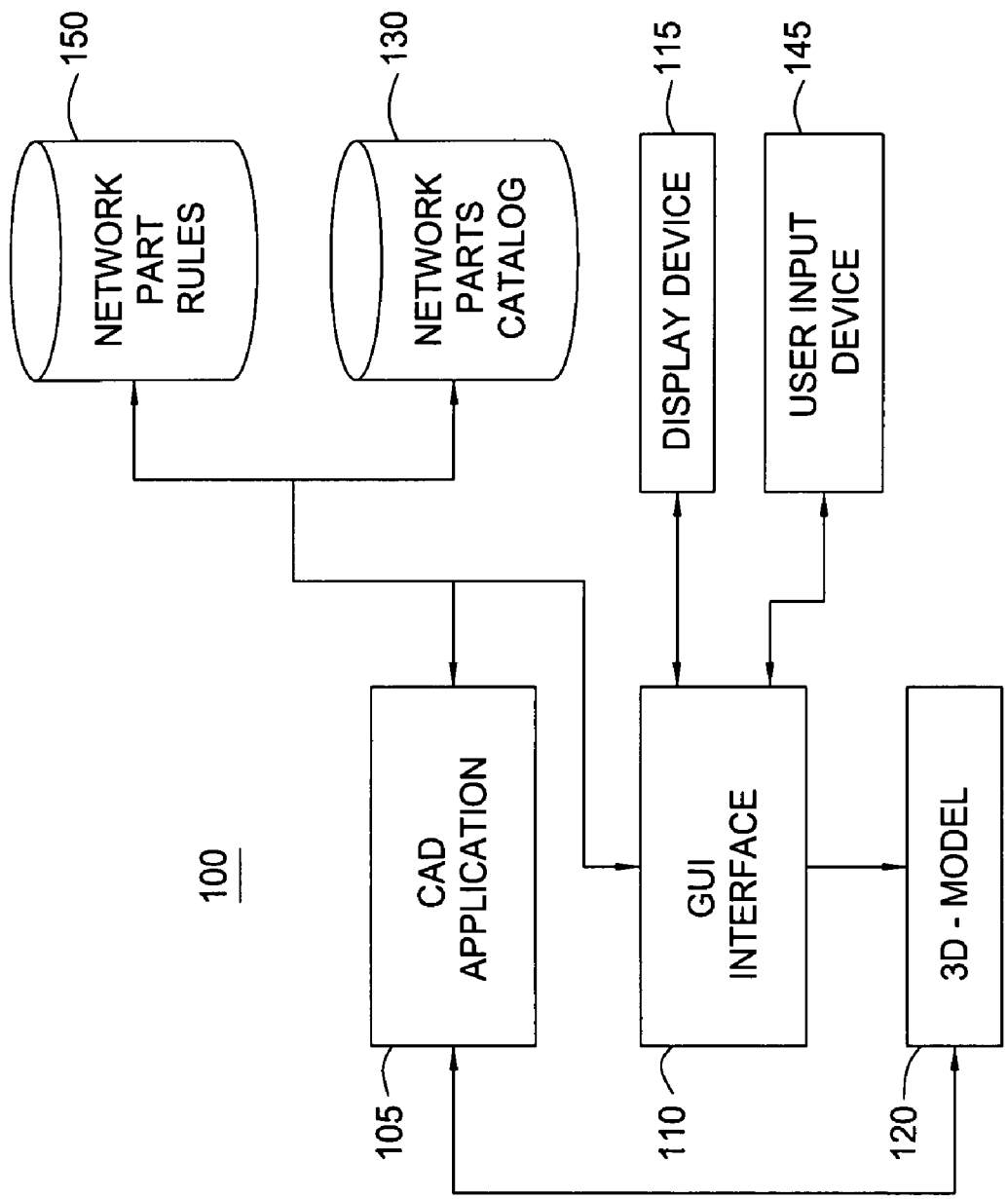
FIG. 1 is a block diagram illustrating a components used to construct a 3D computer model of a utility network, according to one embodiment of the invention.

FIG. 1 is a functional block diagram illustrating an exemplary CAD environment 100 for generating a 3D computer model 120 of a utility network. As shown, the CAD environment 100 includes, without limitation, CAD application program 105, graphical user interface 110, 3D model 120, user input devices 145, display device 115, network parts catalog 130, and network part rules 150.

In one embodiment, the components illustrated in environment 100 may be implemented using computer software applications executing on existing computer systems, e.g., desktop computers, server computers, laptop computers, tablet computers, and the like. The software applications described herein, however, are not limited to any currently existing computing environment or programming language, and may be adapted to take advantage of new computing systems as they become available. Additionally, the components illustrated in FIG. 1 may be executing on distributed systems communicating over computer networks including local area networks or large, wide area networks, such as the Internet. For example, a graphical user interface 110 may include a software program executing on a client computer system communicating with a CAD application 105 and a network parts catalog 130 residing on a networked server computer.

In one embodiment, the CAD application 105 comprises a computer program configured to allow a user interacting with GUI interface 110 to generate a 3D model 120. Preferably, the Civil 3D® application program and associated utilities available from Autodesk®, Inc. may be used. The data attributes, properties, and geometry data regarding to the real world structure being modeled may be stored in 3D model 120.

The graphical user interface 110 may provide GUI elements that allow a user to select, add, and modify the network parts (and part attributes) included in the 3D model 120. As a user specifies the characteristics of the utility network being modeled, 3D display device 115 provides a visual representation of the 3D model 120. The data for the 3D model 120 may be used as to generate the various views or graphical representations of the 3D model 120 as well as to generate 2D engineering and construction documentation for the 3D model 120. Although distinct from one another, each view (e.g., profile, plan or a cross-section view) is generated from a common set of network parts data. Additionally, GUI interface 110 may provide displays that inform a user of any network parts with data properties or attributes that violate one or more rules defined for a particular part. The rules may be applied when parts are placed within a 3D model or may be applied to validate an existing model. Further, the rules may include customizable parameters, allowing users to evaluate a given 3D model of a utility network using many different sets of network part rules 150, without actually modifying the data associated with the model.

Input devices 145 allow a user to interact with the 3D model 120 and GUI interface 110. Typically, user input devices 145 include a mouse pointing device and a keyboard, and display device 115 is a CRT monitor or LCD display.

The network parts catalog 130 provides a master collection of parts available for use in composing a 3D model 120 of a utility network. Parts in the catalog may be fixed, single-size parts or part of a parametric part family. Each network part in catalog 130 provides an individual component that may be selected as an entity for inclusion in 3D model 120. Importantly, parts may themselves be defined as a composite of multiple parts that may be managed as a single entity.

In one embodiment, the parts catalog 130 may include network parts representing the pipes, structures, and fittings of a gravity based utility network. A "pipe" is a network part serving to move fluids from one point to another. In one embodiment, the CAD application 105 models a pipe network part by sweeping the cross-sectional shape of the pipe along a base curve, which may be a line for a straight pipe, or a more complex curve. Examples of "pipe" network parts include: circular pipes, elliptical pipes, and rectangular pipes, etc. "Pipe" network parts may be used to connect structures, and a "structure" is a network part serving a specific engineering function in the system. Examples of "structure" network parts include manholes, catch basins, headwalls, flared end sections, etc. "Fittings" and "junctions" are network parts serving to branch pipe flow or alter flow direction. Examples of this network part type include, elbow, wye, tee, and cross fittings, etc. To model other utility networks, a different parts catalog may be provided.

In one embodiment, a 3D model 120 may include one or more utility networks, e.g., a 3D model may include both a surface water network and a network used to provide water and sewage services. In turn, each utility network may be constructed using a collection of network part instances placed in the 3D model. As described in greater detail below, when an instance of a network part is placed in a 3D model, the part rules 150 associated with the network part may be applied to the instance. Depending on the properties of the rule, this may modify the data attributes or properties for the network part within the 3D model, or simply flag a rule violation for later review.

In practice, the rules provided for a part may vary depending both on the particular part type, as well as on the requirements for a particular design application. Thus, each network part may be associated with one or more part rules 150. As described above, examples of part rules 150 that may be provided for a surface water utility network include minimum pipe slope, maximum pipe slope, minimum pipe cover (depth), maximum length between structures, pipe-drop within structures, surface placement offset, automated part sizing, etc. The part rules 150 provide a set of rules that may be customized both in terms of rule substance and application.

In one embodiment, each rule may be defined using a logic component, such as an executable script. For example, each rule may be implemented as a macro composed using Visual Basic® for Applications (VBA). However, other scripting languages or programmatic methods may be used. In one embodiment, the rules associated with a particular network part may specify a set of customizable parameters. The parameters are used to define how the rule will be applied to instances of an associated network part in a 3D model. This allows a rule to specify selected characteristics of a network part and allows users to define a version of the rule regarding the use of the network part in a particular 3D model. Additionally, users of the CAD application 105 may be provided an Application Program Interface (API) allowing users to compose custom rules to apply to particular network part. This provides an extensible interface to the rules system beyond just the parameters for rules provided with a particular collection of network parts.

Figure 2:
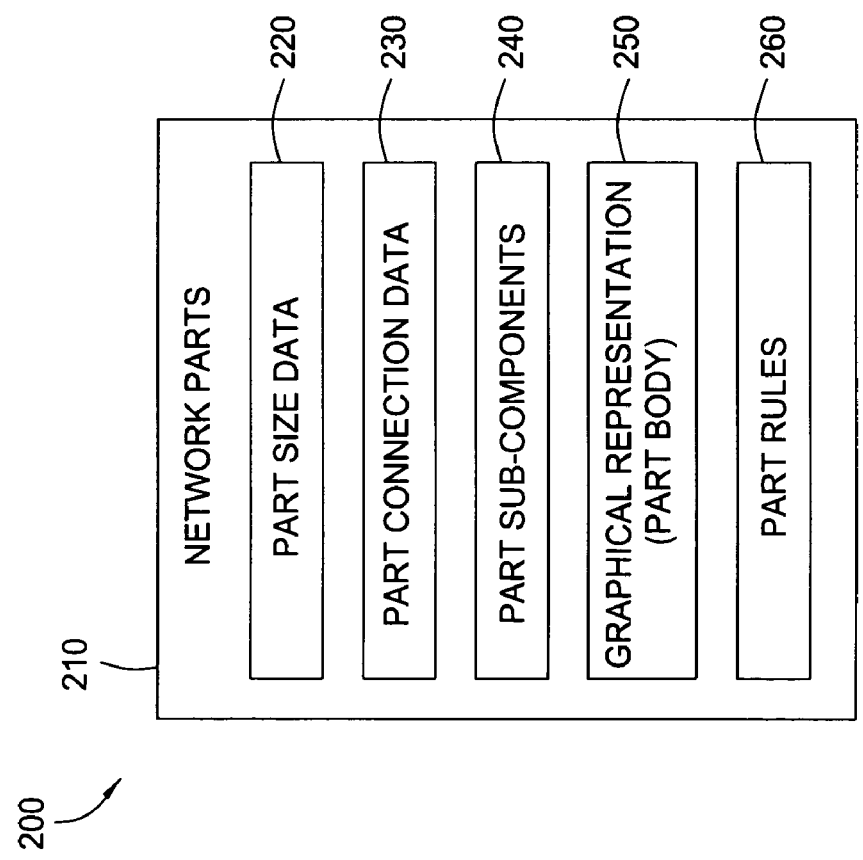
FIG. 2 illustrates an embodiment of a data element defining a network part.

FIG. 2 is a block diagram 200 illustrating an embodiment of a data element defining a network part. Illustratively, network part 210 may include components such as network part size data 220, part connection data 230, part sub components 240, part body 250, and part rules 260. Each network part 210 may be defined using some or all of these data elements (220-260). Further, each network part may reflect properties of the real-world object corresponding to the part. Therefore, the 3D model 120 composed from the network parts has characteristics mirroring those of a real-world utility network.

The network part size data 220 may include a data record used to store a set of size and location parameters of a network part 210 that has been added to a 3D model 120. The part size data may be fixed for a given network part or may be parametric. For example, parametric data may include size values selected from a pre-defined list or selected from a given range. Alternatively, multiple parameters may be grouped in a table and be selected together as a row, or size values may be defined as a calculation dependent on other parameter values.

Once a network part 210 is integrated into a particular 3D model 120, part connection data may be used to manage connections between the parts 210 and other parts in the 3D model 120. For example, each network part 210 may have one or more connections to other parts in the 3D model. Further, a network part 210 may itself be composed of other network parts. Accordingly, subcomponent data 240 may provide a list of one or more network parts integrated as a single entity. Such a network part may be provided by the catalog 120. Alternatively, the user interface 110 may allow users to group multiple network parts together, and subsequently manipulate the group as a single network part entity.

The part body 250 provides a 3D graphical image representing the part that may be used in the 3D model. The part body 250 may also include data such as part-part interference, part volume, connection rules, etc. In one embodiment, the graphical representation for part body 250 may include data defining a bounding shape that provides an approximate 3D body representation of the part as a cylinder, box, or spherical solid, or an indication of a routine used to generate the approximate 3D body from part size data 220. The graphical representation approximates the real-world appearance of a particular network part 210. Part rules 260 identifies the collection of rules that are associated with a given network part.

Figure 3:
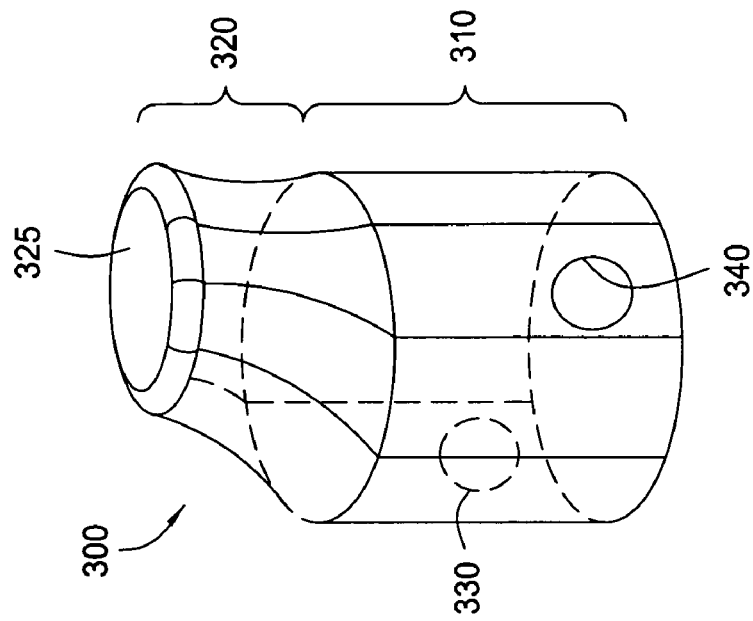
FIG. 3 illustrates an exemplary graphical representation of a network part.

FIG. 3 shows a graphical representation of a part body 250. In this case part body 250 provides a 3D model representation of a catch basin 300. As illustrated, the catch basin is defined as a composite of other network parts, including a barrel section 310, an eccentric barrel cap 320, and a manhole cover 325. Additionally, the barrel section 310 includes input/outlet ports 330 and 340. Each of these components may itself be a network part that may be individually manipulated. The coordinates in the 3D model where the catch basin 300 is inserted may be selected by the user creating the utility model. When placed at a particular location, the user may also select to connect the catch basin 300 with other network parts already present in the 3D model.

Figure 4:
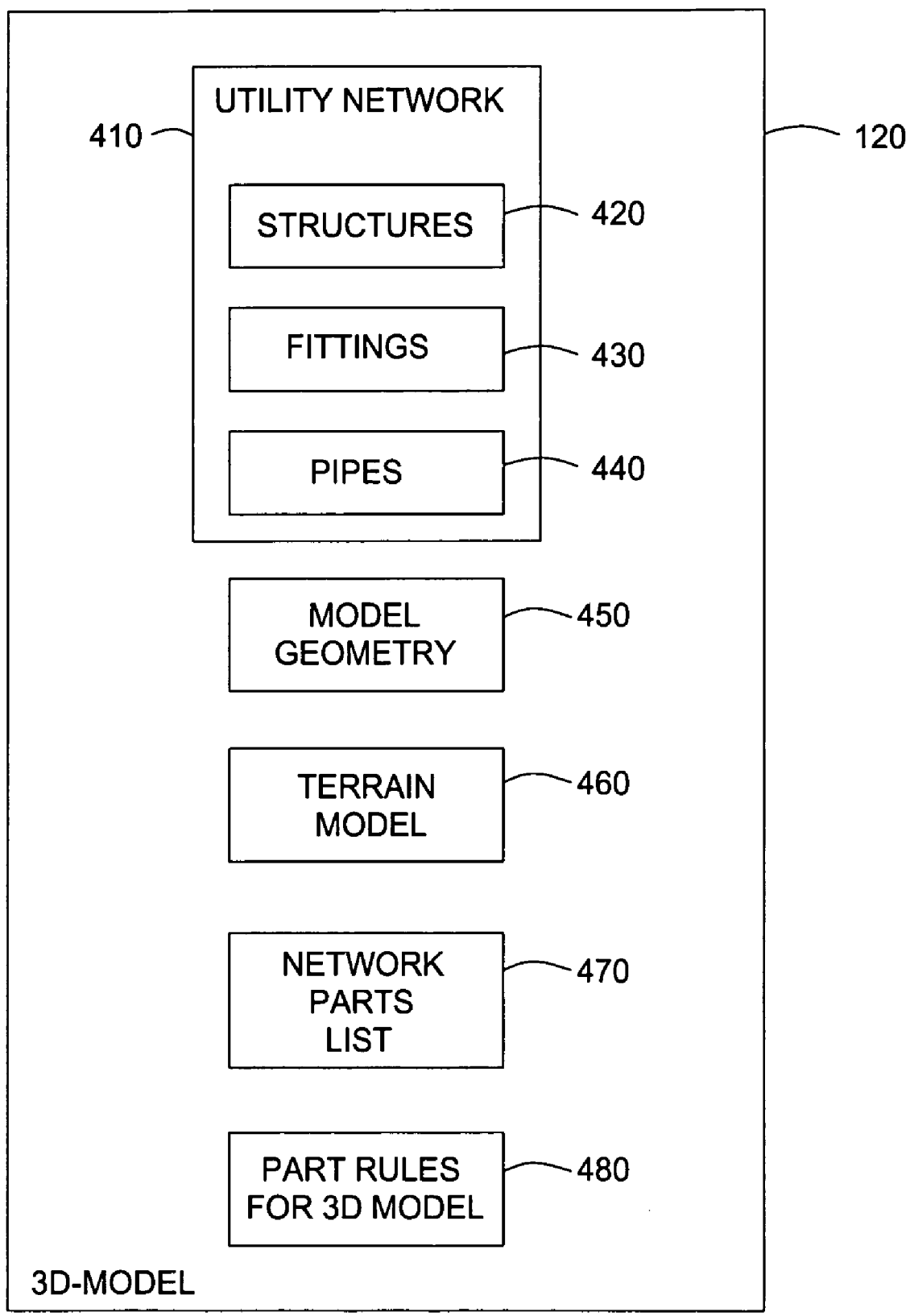
FIG. 4 is a block diagram illustrating data elements used to define a 3D model of a utility network, according to one embodiment of the invention.

FIG. 4 is a block diagram illustrating data elements used to define a 3D model 120, according to one embodiment of the invention. The 3D model 120 includes one or more utility network systems 410, each including the network parts of a particular utility network. In one embodiment, the individual network parts allow a user to compose a 3D model 120 of a utility network from individual parts, much like a real-world utility network. Regardless of the type of utility network, however, each network system 410 may be constructed using a collection of inter-connected parts.

In addition, the 3D model 120 includes model geometry 450, terrain model 460, network parts list 470 and part rules 480. Network parts list 470 may indicate a collection of parts 3D that may be used to compose a particular utility network 410. Depending on the real-world utility network being modeled, network parts list 270 may be used to specify the parts available for inclusion in a particular 3D model 120. In addition, as the 3D model 120 provides a graphical representation of a corresponding to a real world utility network, the model geometry 450 and terrain model data 460 may define the geography present for a particular location. Typically, the geography represents the real-world location being modeled. Depending on the application, a 3D model may include one or more terrain models 470 and geometry data 460 that may each be used to represent sections of both existing ground surfaces (and sub-surfaces). The network part rules 480 specify the parameters and attributes for a set of rules to use in a particular utility network. That is, as described above each network rule may include a set of one or more customizable parameters. Thus, part rules 480 reflect the actual parameters for the rules to use with the 3D model 120. Thus, by providing users with a custom set of parts, and a custom set of rules to manage the selected network parts, the design of a particular 3D model of a utility network may be greatly simplified.

Figure 5:
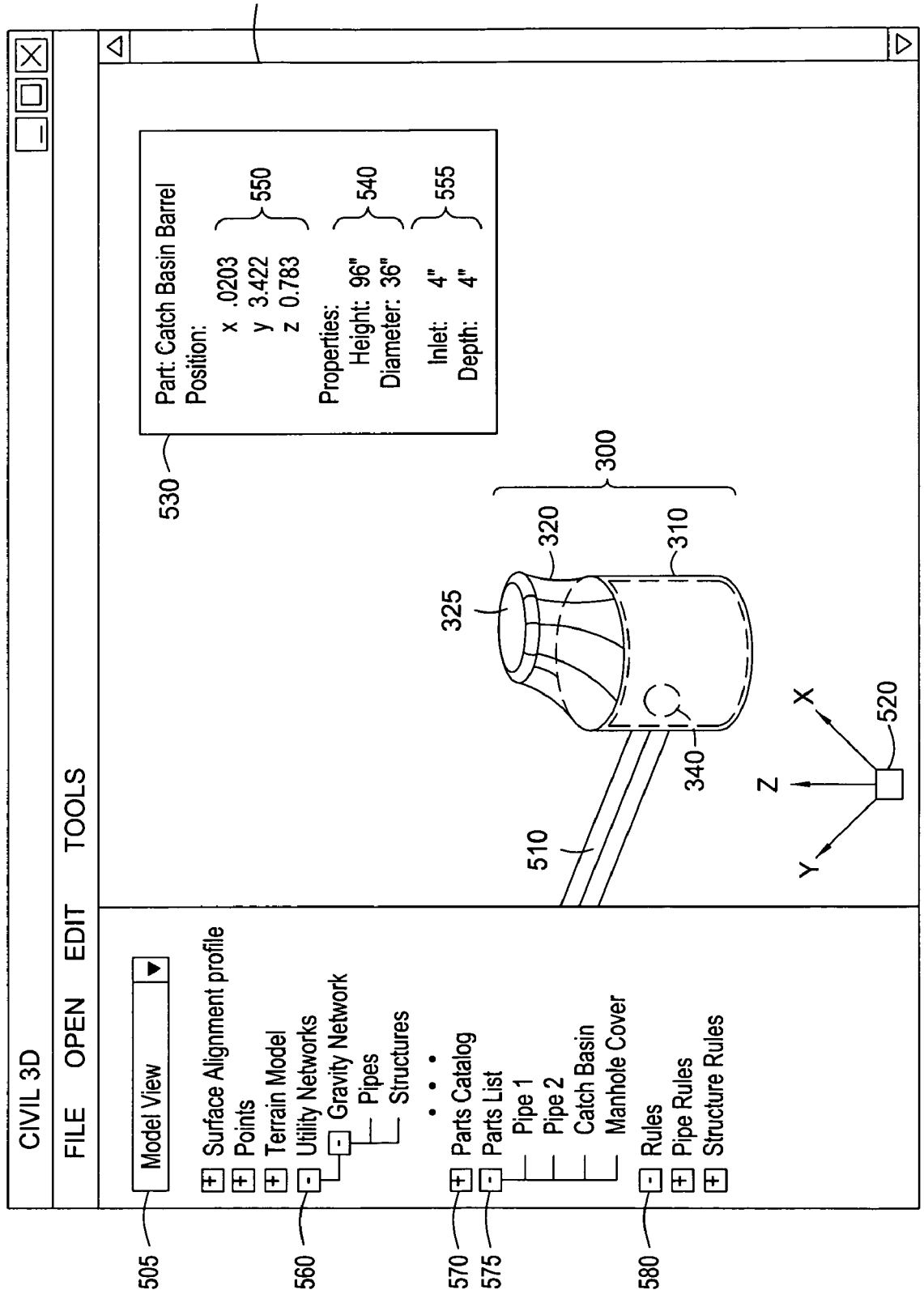
FIG. 5 illustrates a model view of a utility network, according to one embodiment of the invention.

FIG. 5 illustrates a portion of a 3D model view of a utility network, according to one embodiment of the invention. Illustratively, a view type 505 is set to "model view." Accordingly, display area 515 shows a 3D view of model 120. In this example, the display area 515 renders a 3D view of a portion of a pipe 510 connected to catch basin 300. On the left side of FIG. 5 shows a of variety of attributes regarding the 3D model 120, including utility networks 560, parts catalog 570, parts list 575 and part rules 580. Each of these elements has been described above. Perspective indicator 520 indicates that the view 500 illustrates the 3D model 120 from a 3D perspective using the X and Y axes to represent a grid-based location of a part element in the 3D model and the Z axis to represent an elevation. The basin 300 network parts constituting catch basin 300 may be individually selected and modified, or other parts may be selected and added to the 3D model. When additional parts are added, the network part rules 580 associated with a network part may be applied. The view 500 also displays network part annotation 530 for the catch basin 300. The annotation 530 corresponds to the network part data for barrel section 310 and displays parametric values 540 selected for barrel section 310, along with network part instance data specifying the location values 550 and 555 regarding the catch basin 300.

Figure 6:
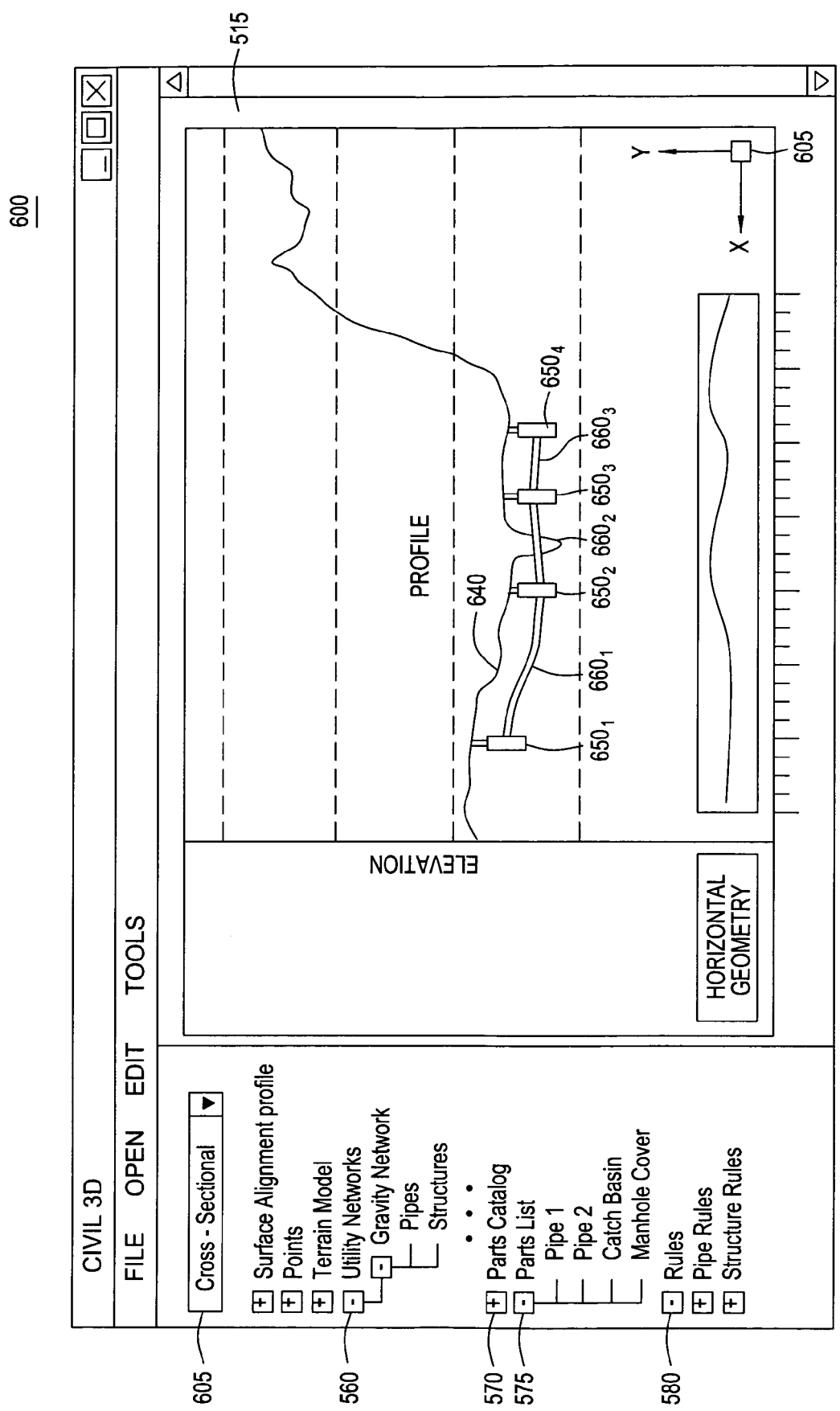
FIG. 6 illustrates a profile view of a utility network, according to one embodiment of the invention.

FIG. 6 illustrates a second view 600 of the 3D model 120. Illustratively, a view type 605 is set to "Cross-Sectional." Accordingly, display area 515 shows a profile view 600 of model 320. The profile view 600 may be generated directly from the network parts present in 3D model 120. Thus, the 2D profile view 600 is generated from the same collection of network parts (e.g., structures 420, fittings 430 and pipes 440) included in the 3D model 120. Further, a 2D view created from the 3D model may be easily edited by changing the attributes associated with a network part, or by changing data values associated with an instance of the network part within the 3D model (e.g., data values specifying the location of the part using coordinates of the terrain model 460).

Perspective indicator 605 indicates that display area 515 shows a two dimensional rendering of 3D model 120. Ground surface boundary 640 is based on the model geometry 250 and terrain model data 460. Illustratively, profile view 600 includes four "structure" network parts $650_{1\text{-}4}$ connected by three pipe network parts $660_{1\text{-}3}$. As shown, the network part $650_4$ corresponds to the catch basin 300 illustrated in FIG. 3 and plan view 500. As shown, pipe $660_1$ has relatively consistent amount of ground cover, and pipe $660_2$ is shown traversing through a small gully. The interaction of these latter two aspects of the 3D model 120 illustrated in view 600 with a collection of network part rules 580 is described below.

Figure 7:
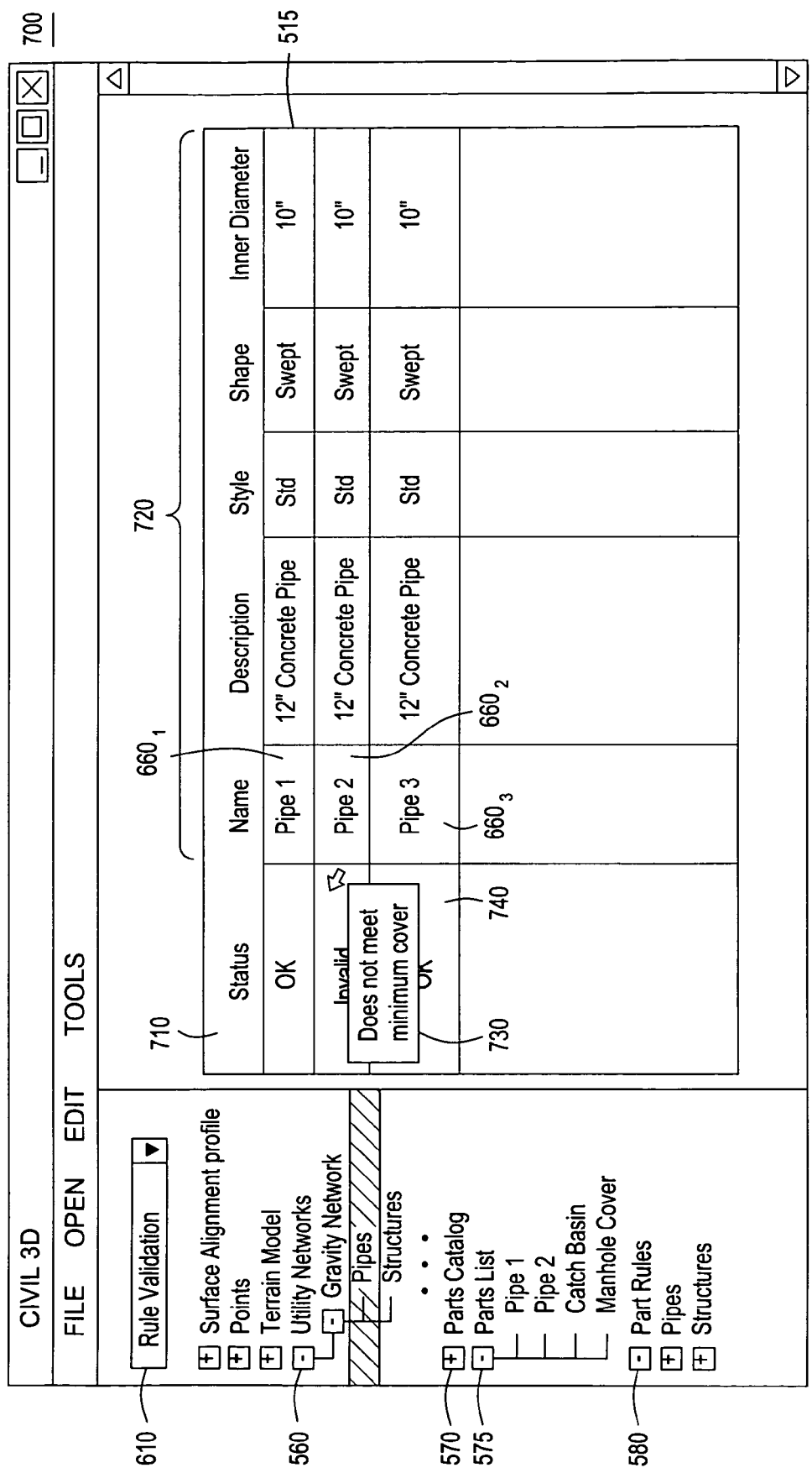
FIG. 7 illustrates a graphical user interface display showing the status of network parts included in a 3D utility network model, according to one embodiment of then invention.
Figure 9:
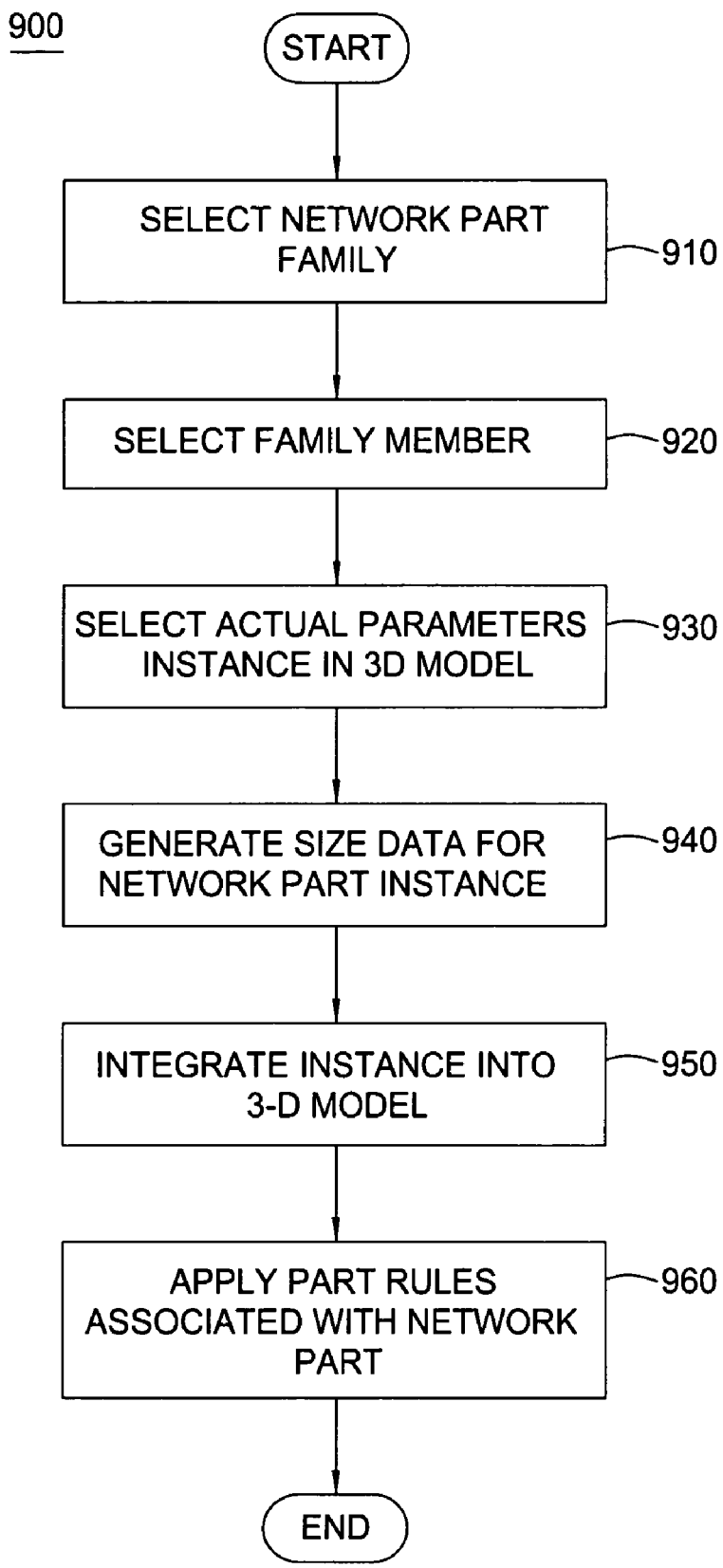
FIG. 9 illustrates a method for composing a 3D model of a utility network, according to one embodiment of the invention.

FIGS. 7-9 illustrate different actions a user interacting with CAD application 105 may perform to create, display, and modify a 3D model of a utility network. In the remaining discussion, it is assumed that a user is interacting with a CAD application 105 configured according embodiments of the invention, as described above. Thus, the CAD application 105 may be configured to provide a collection of network parts that may be selected and integrated into a 3D model 120; the CAD application may allow a user to switch between multiple views, such as plan, profile, and perspective views; and as network parts are inserted, the CAD application 105 may be configured apply a set of design rules associated with the part being inserted into the 3D model.

First, FIG. 7 illustrates a third view 700 of the 3D model 120. Illustratively, a view type 605 is set to "rule validation." Accordingly, display area 515 shows a tabular list of rules associated with network pipe objects in 3D model 120 (i.e., pipes $660_{1\text{-}3}$ from FIG. 6). Illustratively, the table displayed includes a status column 710 and a number of attribute columns 720. "Pipe" parts $660_1$ and $660_3$ are shown with an "OK" status, whereas "pipe" part $660_2$ is illustrated with an "invalid" status. Referring back to FIG. 6, it can be seen that "pipe" parts $660_1$ and $660_3$ are shown a relatively consistent amount of cover, in compliance with the design rule. Similarly, it can be seen that pipe $660_2$ is illustrated as traversing through a narrow gully, where a short segment of the pipe is exposed above ground. Thus, the placement of pipe $660_2$ may violate a minimum cover rule requiring a pipe to always be placed at a certain depth. The violation of such a rule is illustrated in tool-tip 730, which may be provided as part of graphical user interface 110. When the mouse cursor is hovered over an item, without clicking it, a small box appears with the name or description of the item being hovered over. In this case, the tool tip indicates that "pipe" part 660₂ fails to satisfy a minimum cover rule.

FIG. 8 illustrates a graphical user interface display 800 showing network part rules, according to one embodiment of the invention. In this example, three rules are displayed; a "rim-elevation" rule 810, a "pipe-slope" rule 815 and a "minimum-cover" rule 820. Associated with each part rule 810, 815, and 820 is a parameter value 825, 835, and 845, respectively, specified for the rule. This allows the same rule to be used for different 3D models (or network parts) with different parameter values. Thus, the application of the network part rules is highly customizable. Further, each rule 810, 815 and 820 includes an indication 830, 840, and 850, respectively, of whether the rule should be applied dynamically when an instance of an associated network part is placed within a 3D model, or should be used to validate whether the placement of a particular network part complies with the rule. The rules illustrated in FIG. 8, however, are provided as examples of rules appropriate for a surface water utility network.

As stated above, in practice, the rules provided for a network part may vary depending both on the particular part type, as well as on the requirements for a particular design application. Further, embodiments of the invention may be used to subject a given 3D model to many permutations of rules. For example, a user may repeatedly modify the parameter values and then, after reapplying the rules, evaluate which parts comply with the modified rules.

FIG. 9 illustrates a method 900 for composing a 3D model of a utility network, according to one embodiment of the invention. Persons skilled in the art will understand that any system configured to perform the method steps, in any order, is within the scope of the present invention. The method begins at step 910 where a user selects a network part from a parts list. First, the user may select a part from a given part family (e.g., a family of similar pipes, or a family of catch basins). Each family provides a group of related network parts. Next, at step 920, the user selects the particular network part family member. At step 930, the user interface 110 may display the current (or default) set of attributes for the selected network part. In response, the user may accept these values or modify them as desired. Once the network part to be added to the 3D model is specified, at step 940 the CAD application 105 generates the appropriate size and instance data for a network part instance included in the 3D model. At step 950, the CAD application 105 integrates the instance of the selected network part into the 3D model. At step 960, design rules associated with the network part are applied (e.g., the rules 810, 815, and 820 illustrated in FIG. 8). The application of design rules is further described in conjunction with FIG. 10. The method 900 may be repeated for an arbitrary number of network parts allowing users to add as many parts as required to complete a particular 3D model 120.

Figure 10:
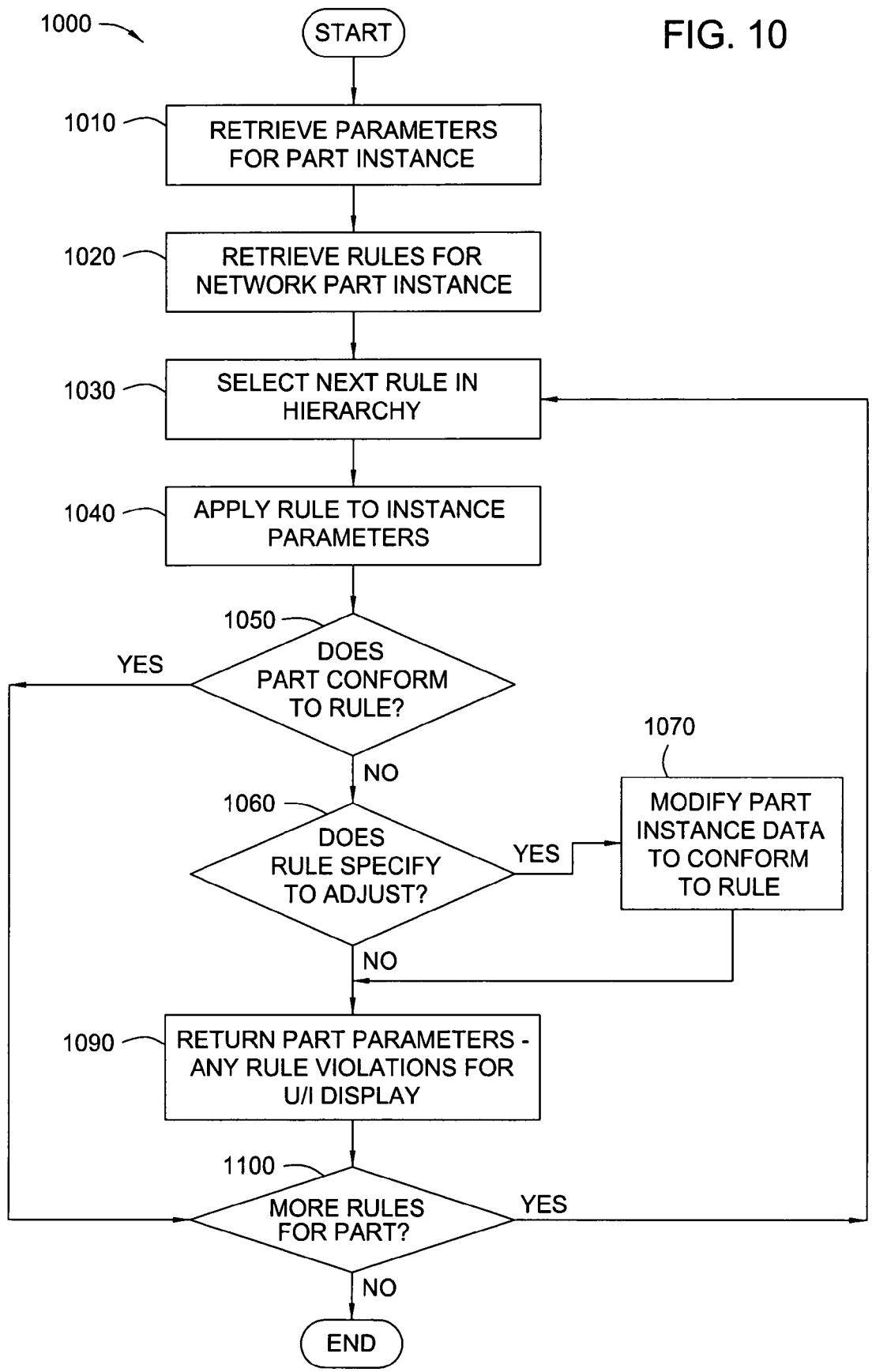
FIG. 10 illustrates a method for applying a set of design rules to a 3D model of a utility network, according to one embodiment of the invention.

FIG. 10 illustrates a method 1000 for applying a set of design rules to a 3D model of a utility network, according to one embodiment of the invention. The method 1000 further illustrates actions that may be performed as part of step 960 of method 900. Accordingly, the method begins after a user has selected an instance of a network part to include in a 3D model 120. At step 1010, the CAD application 105 retrieves the parameters for the particular network part instance. At step 1020, the CAD application 105 identifies the collection of rules specified for the particular network part. Once the parameters and rules for a network part are identified, a loop begins to test each of the rules against the instance parameters. Accordingly, at step 1030, a rule is selected in the rule hierarchy. In one embodiment, rules may be defined to have different priorities. Thus, the rule selected will be one with the highest priority, and so on.

At step 1040, the rule is applied to the instance parameters associated with the network part. In one embodiment, this may include comparing the instance values for the part with various criteria such as minimum, maximum, or allowed range. At step 1050, a determination is made whether the part complies with the current rule being evaluated. If not, at step 1060, a determination is made whether the rule currently being evaluated specifies that the instance data should be dynamically modified to comply with the rule. If so, the method proceeds to step 1070 and modifies the instance data such that the network part complies with the rule. For example, if a part specifies a minimum amount of ground cover, the position of the part within the 3D model 120 may be modified to comply with such a requirement.

If the CAD application 105 determines that the rules does not specify go adjust, (or alternatively, after making the adjustments as part of step 1070), the method proceeds to step 1090 where the results are returned. For example, if the part parameters have been modified, the modified parameters may used to update the model 120. Alternatively, if the part violates the rule, an indication of such may be retuned for display in user interface 110. At step 1090, if more rules are associated with the network part, the method returns to step 1030 and selects the next rule from the hierarchy and proceeds through additional iterations of the steps 1030-1090. An example should illustrate these operations. Returning to FIG. 6, as shown, the "pipe" part 660₂ fails to comply with "minimum-cover" rule 820. Accordingly, a rule violation for this part may be detected at step 1040. However, this rule also indicates that adjustments are set to "false." Thus, at step 1060, the pipe placement of pipe 660₂, although in violation of this rule, is not be modified.

In addition to being applied when rules are added to a 3D model (or when existing parts are modified), embodiments of the invention may be used to validate a 3D model against multiple permutations of design rules. As each 3D model may be constructed from a collection of network parts, a 3D model may be validated by evaluating each part included in a given 3D model, according to the steps 1030-1090 of method 1000. Once completed, a user may view a report (e.g., "rule validation" view illustrated in FIG. 7). Furthermore, by changing the instance data for an individual part (or part family), or by modifying the set of rules to be applied, a wide variety of real-world scenarios may be evaluated.

While the foregoing is directed to embodiments of the present invention, other embodiments of the invention may be devised without departing from the basic scope thereof, and the scope thereof is determined by the claims that follow.

What is claimed is:

1. A computer-implemented method for generating a three-dimensional (3D) model of a utility network within a computer-aided design (CAD) application that includes a plurality of network parts, the method comprising the steps of:
receiving a selection of a network part that is included in a catalog of network parts, wherein the selected network part is associated with a set of design rules, and wherein each design rule in the set of design rules includes one compliance parameter associated with the selected network part and an indication of whether an instance of the selected network part should be dynamically modified to comply with the associated design rule when the instance of the selected network part is placed within the 3D model;

incorporating the instance of the selected network part into the 3D model of the utility network;

identifying a first design rule in the set of design rules associated with the selected network part, wherein a user-specified priority is specified for each design rule in the set of design rules and higher priority design rules are applied first;

by execution of the CAD application, comparing the first design rule to a first instance parameter associated with the selected network part and determining that the instance of the selected network part does not comply with the first design rule;

by execution of the CAD application, determining that the first design rule indicates that the instance of the selected network part within the 3D model of the utility network should be dynamically modified to comply with the first design rule; and by execution of the CAD application, dynamically modifying the first instance parameter to bring the instance of the selected network part into compliance with the first design rule.

2. The method of claim 1, further comprising the steps of:
connecting the instance of the selected network part and an instance of another network part to form, a new network part; and
including the new network part in the catalog of network parts.

3. The method of claim 1, wherein the first design rule is an allowed range.

4. The method of claim 1, wherein the indication of whether the associated design rule is applied dynamically to modify the instance of the selected network part within the 3D model of the utility network is specified by a user.

5. The method of claim 1, wherein each design rule in the set of design rules is individually enabled or disabled.

6. The method of claim 1, wherein a graphical representation for the selected network part includes data defining a bounding shape that provides an approximate 3D body representation of the selected network part.

7. A non-transitory computer-readable medium including program instructions that, when executed by a processor, generates a three-dimensional (3D) model of a utility network within a computer-aided design (CAD) application that includes a plurality of network parts by performing the steps of:

receiving a selection of a network part that is included in a catalog of network parts, wherein the selected network part is associated with a set of design rules, and wherein each design rule in the set of design rules includes one compliance parameter associated with the selected network part and an indication of whether an instance of the selected network part should be dynamically modified to comply with the associated design rule when the instance of the selected network part is placed within the 3D model;

incorporating the instance of the selected network part into the 3D model of the utility network;

identifying a first design rule in the set of design rules associated with the selected network part, wherein a user-specified priority is specified for each design rule in the set of design rules and higher priority design rules are applied first;

by execution of the CAD application, comparing the first design rule to a first instance parameter associated with the selected network part and determining that the instance of the selected network part does not comply with the first design rule;

by execution of the CAD application, determining that the first design rule indicates that the instance of the selected network part within the 3D model of the utility network should be dynamically modified to comply with the first design rule; and by execution of the CAD application, dynamically modifying the first instance parameter to bring the instance of the selected network part into compliance with the first design rule.

8. The computer-readable medium of claim 7, further comprising the steps of:
connecting the instance of the selected network part and an instance of another network part to form, a new network part; and
including the new network part in the catalog of network parts.

9. The non-transitory computer-readable medium of claim 7, wherein the first design rule is an allowed range.

10. The non-transitory computer-readable medium of claim 7, wherein the indication of whether the associated design rule is applied dynamically to modify the instance of the selected network part within the 3D model of the utility network is specified by the user.

11. The non-transitory computer-readable medium of claim 7, wherein each design rule in the set of design rules is individually enabled or disabled.

12. The non-transitory computer-readable medium of claim 7, wherein a graphical representation for the selected network part includes data defining a bounding shape that provides an approximate 3D body representation of the selected network part.

13. A computing device comprising:
a processor; and
a memory configured to store program instructions that, when executed by the processor, generate a three-dimensional (3D) model of a utility network within a computer-aided design (CAD) application that includes a plurality of network parts by performing the steps of:

receiving a selection of a network part that is included in a catalog of network parts, wherein the selected network part is associated with a set of design rules, and wherein each design rule in the set of design rules includes one compliance parameter associated with the selected network part and an indication of whether an instance of the selected network part should be dynamically modified to comply with the associated design rule when the instance of the selected network part is placed within the 3D model;

incorporating the instance of the selected network part into the 3D model of the utility network;

identifying a first design rule in the set of design rules associated with the selected network part, wherein a user-specified priority is specified for each design rule in the set of design rules and higher priority design rules are applied first;

by execution of the CAD application, comparing the first design rule to a first instance parameter associated with the selected network part and determining that the instance of the selected network part does not comply with the first design rule;

by execution of the CAD application, determining that the first design rule indicates that the instance of the selected network part within the 3D model of the utility network should be dynamically modified to comply with the first design rule; and by execution of the CAD application, dynamically modifying the first instance parameter to bring the instance of the selected network part into compliance with the first design rule.

14. The computing device of claim 13, further comprising the steps of:

connecting the instance of the selected network part and an instance of another network part to form, a new network part; and including the new network part in the catalog of network parts.

15. The computing device of claim 13, wherein the indication of whether the associated design rule is applied dynamically to modify the instance of the selected network part within the 3D model of the utility network is specified by a user.

16. The computing device of claim 13, wherein each design rule in the set of design rules is individually enabled or disabled.

17. The computing device of claim 13, wherein a graphical representation for the selected network part includes data defining a bounding shape that provides an approximate 3D body representation of the selected network part.

* * * * *

UNITED STATES PATENT AND TRADEMARK OFFICE
CERTIFICATE OF CORRECTION

| | | |
|---|---|---|
| PATENT NO. | : 8,180,597 B2 | |
| APPLICATION NO. | : 11/272317 | |
| DATED | : May 15, 2012 | |
| INVENTOR(S) | : Edward James Connor et al. | |

It is certified that error appears in the above-identified patent and that said Letters Patent is hereby corrected as shown below:

In column 12, Claim 10, line 27, please replace "the user" with -- a user --.

Signed and Sealed this
Thirtieth Day of October, 2012

David J. Kappos
*Director of the United States Patent and Trademark Office*